(12) United States Patent
Trest

(10) Patent No.: US 11,046,160 B2
(45) Date of Patent: Jun. 29, 2021

(54) RIGID COVER FOR DUMP TRAILER TANK

(71) Applicant: Kerry A. Trest, Sour Lake, TX (US)

(72) Inventor: Kerry A. Trest, Sour Lake, TX (US)

( * ) Notice: Subject to any disclaimer, the term of this patent is extended or adjusted under 35 U.S.C. 154(b) by 128 days.

(21) Appl. No.: 16/239,720

(22) Filed: Jan. 4, 2019

(65) Prior Publication Data

US 2020/0215890 A1      Jul. 9, 2020

(51) Int. Cl.
    *B60J 7/16*      (2006.01)
    *B60P 1/56*      (2006.01)
    *B60P 3/22*      (2006.01)

(52) U.S. Cl.
    CPC .............. *B60J 7/1607* (2013.01); *B60P 1/56* (2013.01); *B60P 3/2215* (2013.01); *B60Y 2200/148* (2013.01)

(58) Field of Classification Search
    CPC ... B60J 7/1607; B60J 7/194; B60Y 2200/148; B60P 1/56; B60P 3/2215
    USPC ....... 296/100.02, 183.2, 100.17, 101, 100.04
    See application file for complete search history.

(56) References Cited

U.S. PATENT DOCUMENTS

| | | |
|---|---|---|
| 2,060,130 A | 11/1936 | Scott |
| 2,412,121 A | 12/1946 | Bradshaw |
| 2,620,226 A | 12/1952 | Jones |
| 3,088,774 A | 5/1963 | Bernstein |
| 3,330,225 A | 7/1967 | Barry |
| 3,404,650 A | 10/1968 | Miller |
| 3,481,371 A | 12/1969 | Row |
| 3,485,524 A * | 12/1969 | Nelson ...................... B60P 7/04 296/100.1 |
| 3,628,826 A | 12/1971 | Sibley |
| 3,645,583 A | 2/1972 | Heath |
| 3,707,919 A | 1/1973 | Adler |
| 3,773,380 A | 11/1973 | Stockdill |
| 3,796,168 A | 3/1974 | Zeller |
| 3,897,100 A | 7/1975 | Gardner |
| 4,082,347 A | 4/1978 | Petretti |
| 4,285,539 A | 8/1981 | Cole |
| 4,289,346 A | 9/1981 | Bourgeois |
| 4,324,434 A | 4/1982 | Friese |
| 4,341,416 A | 7/1982 | Richard |
| 4,368,674 A | 1/1983 | Wiens |
| 4,585,267 A | 4/1986 | Friesen |
| 4,627,658 A | 12/1986 | Vold |

(Continued)

OTHER PUBLICATIONS

Office Action dated Jan. 12, 2018 in U.S. Appl. No. 15/358,396.

*Primary Examiner* — D Glenn Dayoan
*Assistant Examiner* — E Turner Hicks

(57) ABSTRACT

The present invention is directed to a rigid cover for a dump trailer tank having a storage region with an open top used to transport bulk material. The rigid cover includes cover side walls having a top wall perimeter and a bottom wall perimeter and is configured along the bottom wall perimeter to correspond in shape with the open top of the trailer tank. The rigid cover includes a cover top connected to the cover side walls along the top wall perimeter and includes one or more ports in the top. The rigid cover includes cover fasteners mounted along the bottom wall perimeter configured to secure the plurality of cover side walls to the trailer tank so the traditional storage region of the trailer tank is transformed into an expanded storage region that allows storage of more bulk material than could otherwise be stored in the trailer tank alone.

17 Claims, 10 Drawing Sheets

(56) References Cited

U.S. PATENT DOCUMENTS

| | | | |
|---|---|---|---|
| D289,748 S | 5/1987 | Proeschl | |
| 4,741,570 A | 5/1988 | Lovaas | |
| 4,883,321 A | 11/1989 | Voigt | |
| 4,981,317 A | 1/1991 | Acosta | |
| 5,133,586 A | 7/1992 | Anderson | |
| 5,190,341 A * | 3/1993 | Simard | B60J 7/1621 |
| | | | 105/377.05 |
| 5,328,228 A | 7/1994 | Klassen | |
| 5,380,058 A | 1/1995 | Short | |
| 5,480,214 A | 1/1996 | Rogers | |
| 5,498,066 A | 3/1996 | Cuthbertson | |
| 5,538,286 A | 7/1996 | Hoff | |
| 5,690,377 A | 11/1997 | Denyer | |
| 5,697,663 A | 12/1997 | Chenowth | |
| 5,697,664 A | 12/1997 | Chenowth | |
| 5,829,818 A | 11/1998 | O'Daniel | |
| 5,890,757 A | 4/1999 | Masterson | |
| 5,924,758 A | 7/1999 | Dimmer | |
| 6,059,349 A | 5/2000 | Doll | |
| 6,139,085 A | 10/2000 | Templin | |
| 6,142,554 A | 11/2000 | Carroll | |
| 6,152,517 A | 11/2000 | Steadman | |
| 6,196,604 B1 | 3/2001 | Hoh | |
| 6,199,909 B1 | 3/2001 | Kass | |
| 6,206,449 B1 | 3/2001 | Searfoss | |
| 6,234,562 B1 | 5/2001 | Henning | |
| 6,250,233 B1 | 6/2001 | Luckring | |
| 6,293,051 B1 | 9/2001 | Matye | |
| 6,322,041 B1 | 11/2001 | Schmeichel | |
| 6,464,283 B2 | 10/2002 | Haddad | |
| 6,499,790 B1 | 12/2002 | Johnston | |
| 6,527,331 B2 | 3/2003 | Searfoss | |
| 6,578,897 B2 | 6/2003 | White | |
| 6,712,419 B1 | 3/2004 | Gothier | |
| 6,722,727 B2 | 4/2004 | Votruba | |
| 6,814,386 B2 | 11/2004 | Wood | |
| 6,857,682 B2 | 2/2005 | Eggers | |
| 6,916,060 B2 | 7/2005 | Searfoss | |
| 6,938,960 B1 | 9/2005 | Eby | |
| 6,983,975 B2 | 1/2006 | Morrow | |
| 6,997,502 B1 | 2/2006 | Reents | |
| 7,032,950 B2 | 4/2006 | Eggers | |
| 7,318,618 B1 | 1/2008 | Yue | |
| 7,370,904 B2 | 5/2008 | Wood | |
| 7,424,943 B2 | 9/2008 | Gausman | |
| 7,552,961 B2 | 6/2009 | Eglinton | |
| 7,866,725 B1 | 1/2011 | Searfoss | |
| 7,878,124 B2 | 2/2011 | Low | |
| 7,967,363 B2 | 6/2011 | Schaefer | |
| 8,002,359 B2 | 8/2011 | Dormaier | |
| 8,056,955 B1 | 11/2011 | Schmeichel | |
| 8,113,565 B2 * | 2/2012 | Zeuner | B65D 88/123 |
| | | | 296/32 |
| 8,152,216 B2 | 4/2012 | Howell | |
| 8,172,301 B2 | 5/2012 | Searfoss | |
| 8,182,019 B1 | 5/2012 | Johnson | |
| 8,182,045 B2 | 5/2012 | Rogers | |
| 8,205,927 B2 | 6/2012 | Eggers | |
| 8,256,355 B2 | 9/2012 | Dial | |
| 8,449,014 B2 | 5/2013 | Fliegl | |
| 8,474,896 B2 | 7/2013 | Ostberg | |
| 8,631,746 B2 | 1/2014 | Knight | |
| 8,641,322 B1 | 2/2014 | Jackson | |
| 8,876,217 B1 | 11/2014 | Medlen | |
| 8,910,996 B2 | 12/2014 | Bremer | |
| 8,967,727 B2 | 3/2015 | Van Mill | |
| 2002/0153751 A1 | 10/2002 | Lenhardt | |
| 2003/0075915 A1 | 4/2003 | Kim | |
| 2005/0073133 A1 | 4/2005 | Dufty | |
| 2008/0073937 A1 | 3/2008 | Circle | |
| 2012/0212032 A1 | 8/2012 | Hauth | |
| 2013/0196725 A1 * | 8/2013 | Bossuyt | A01D 41/1208 |
| | | | 460/119 |
| 2013/0300147 A1 | 11/2013 | Schmeichel | |
| 2015/0061259 A1 | 3/2015 | Fox | |
| 2015/0272000 A1 * | 10/2015 | Claes | A01D 41/00 |
| | | | 56/473.5 |

* cited by examiner

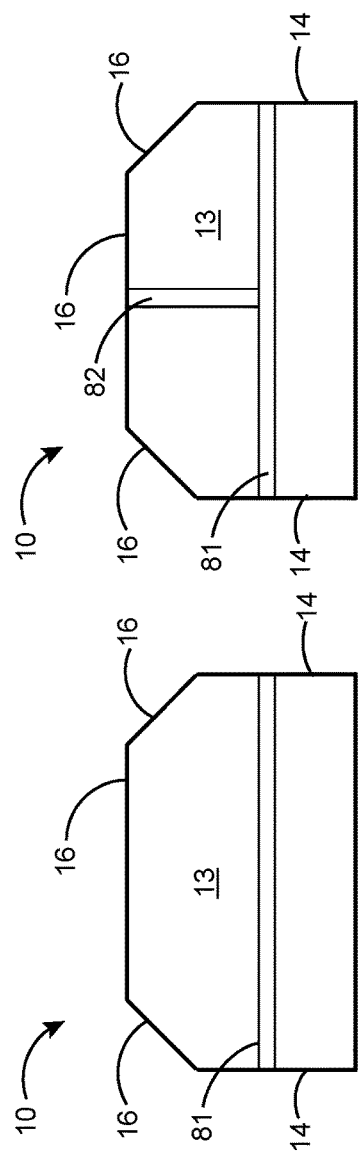
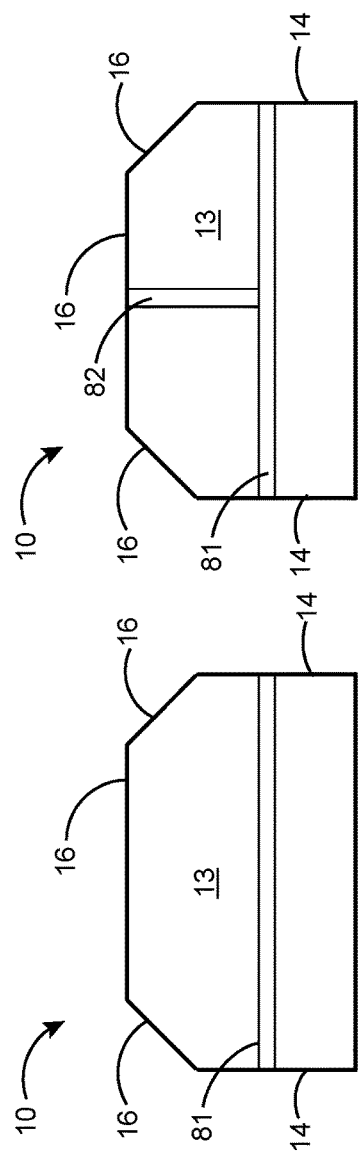
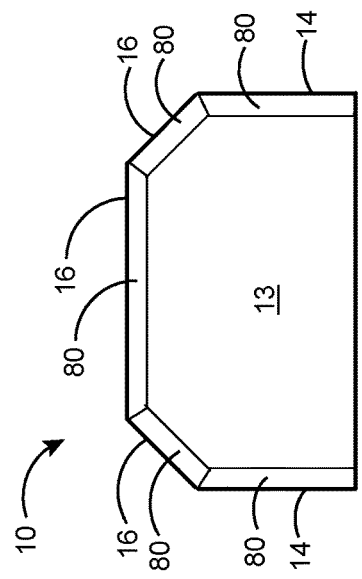
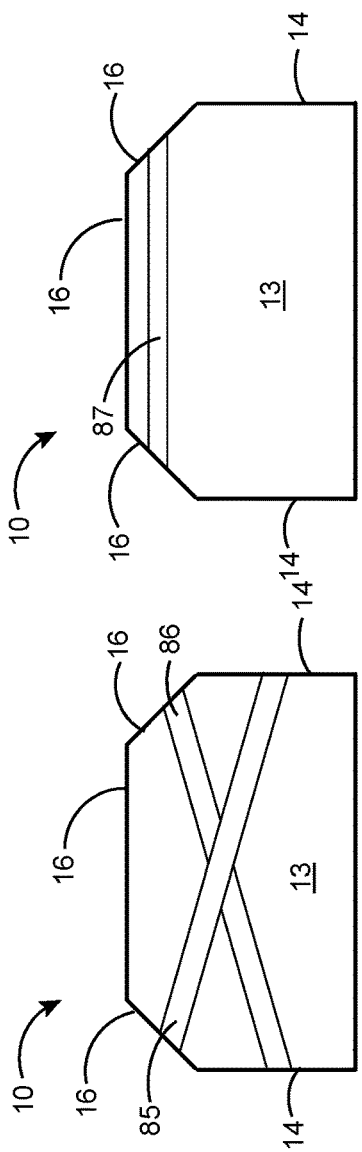
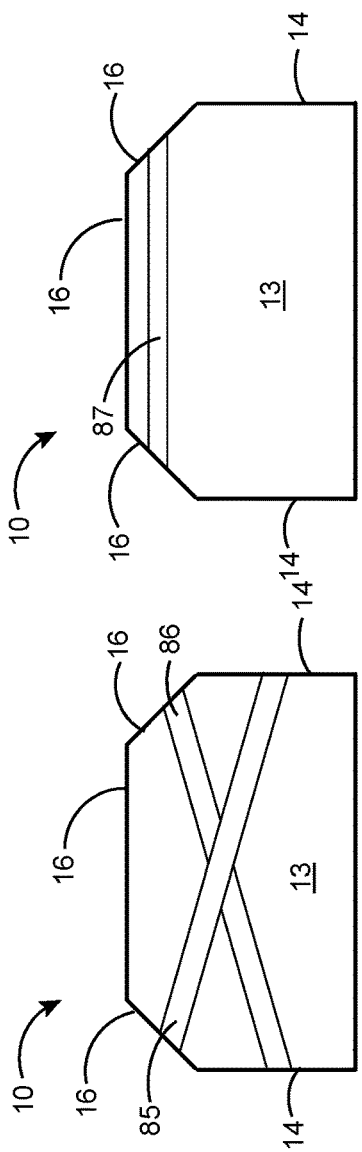
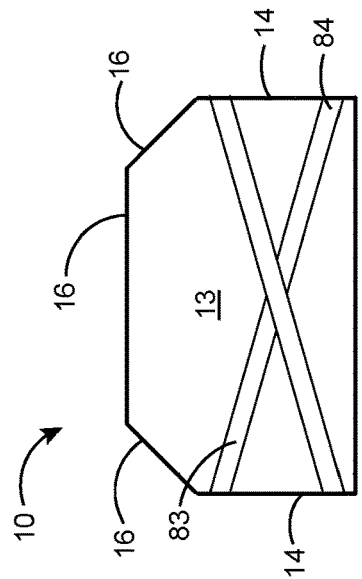

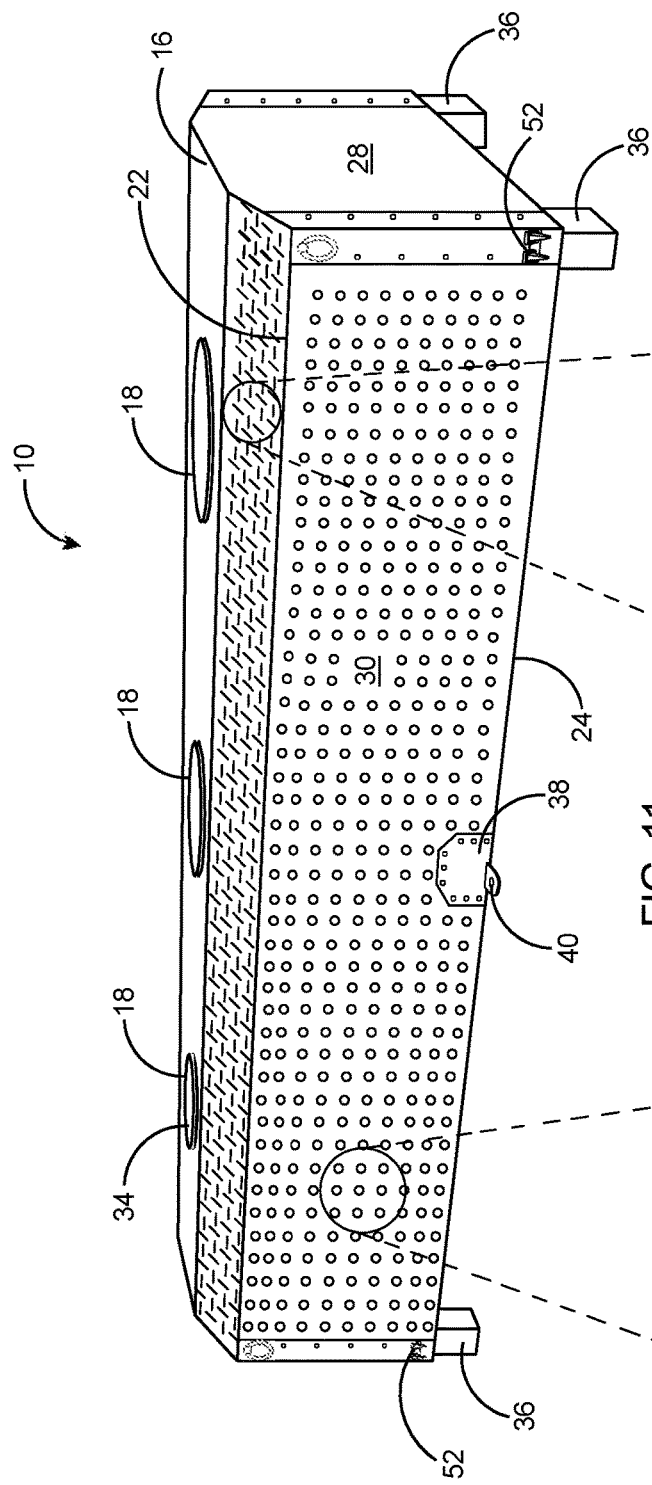
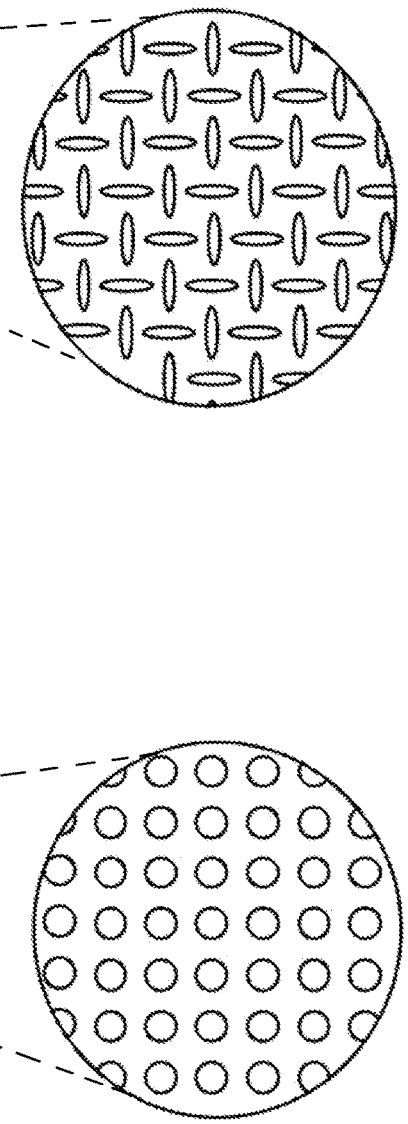

RIGID COVER FOR DUMP TRAILER TANK

CROSS-REFERENCE TO RELATED APPLICATIONS

U.S. patent application Ser. No. 15/358,396 filed Nov. 22, 2016, published as US 2018-0141420 A1, now U.S. Pat. No. 10,086,683.

STATEMENT REGARDING FEDERALLY SPONSORED RESEARCH AND DEVELOPMENT

Not Applicable.

FIELD OF THE DISCLOSURE

The present disclosure relates generally to large truck trailer covers. More specifically, the present disclosure relates to a rigid cover for dump trailers, enabling enhanced trailer capacity with easy loading and unloading capability.

DISCUSSION OF RELATED ART

For many years, dump trailers have been the best choice for transporting a large volume of goods across long distances. Transporting goods using trailers is profitable only if it is possible to transport large volumes which can be rapidly loaded and unloaded. Generally trailers of the same nature have a similar loading capacity and it becomes the transporter's responsibility to increase the load-bearing capacity utilizing an alternate means. Normally a trailer does not have an installed covering for protecting the loaded goods from the weather or loss of some of the load during transport. These drawbacks can have a negative impact on the profitable transportation of goods using trailers.

Conventional methods utilize tarpaulin to cover the loaded area of the trailers to protect the loaded goods. Using tarpaulin covers can cause a delay in the unloading of the goods. Attaching tarpaulin covers in the proper orientation can also require a considerable amount of manpower. In addition to this, tarpaulin covers do not allow for increasing the load capacity. Other conventional methods include the use of pneumatic trailers, which provide a sealed tank that provides increased storage capacity and protects the goods from the outside environment and weather. The drawback to pneumatic trailers is that they are more expensive to purchase and operate given the additional cost and weight associated with the pneumatic system. Also, the unloading time for a typical pneumatic trailer may be as much as twenty minutes as opposed to the twenty seconds or so that it takes to unload a conventional belly dump trailer. Therefore, there is a need for a rigid cover for belly dump trailer which enables the trailer to increase the loading capacity without sacrificing unload times. Such a needed cover would facilitate the loading and unloading of a trailer in a shorter period of time with less manpower. This cover would need to be cost effective and relatively easy to install. Moreover, such a needed cover would provide top load ports for the fast loading and unloading with less loss of cargo. The present embodiment overcomes prior art shortcomings by accomplishing these critical objectives.

SUMMARY OF THE DISCLOSURE

To overcome the limitations found in the prior art, and to minimize other limitations that will be apparent upon the reading of the specification, the present invention is a rigid cover for a dump trailer used to transport bulk material. The dump trailer has a traditional storage region with an open top onto which the rigid cover may be configured as described in these embodiments of the present invention.

The rigid cover includes a plurality of cover side walls, a cover top, one or more ports and a plurality of cover fasteners. The plurality of cover side walls includes a top wall perimeter and a bottom wall perimeter and is configured along the bottom wall perimeter to correspond in shape with the open top of the trailer tank. The plurality of side walls is designed such that it may include a first side wall, a second side wall, a front side wall and a rear side wall, that flares outward away from the center of the rigid cover with respect to the plurality of side walls at the bottom wall perimeter to allow for increased bulk material storage capacity.

The cover top is connected to the plurality of cover side walls along the top wall perimeter. The cover top may be higher at a center region than at side regions adjacent to the plurality of cover side walls to allow for increased bulk material storage capacity. Each of the ports in the top cover may include a port lid which may, for example, be implemented as a removable port lid, sliding port lid, or a hinged port lid.

In some embodiment of the present invention, at least one of the cover top and the plurality of cover side walls includes an interior brace to reinforce structural integrity. Such an interior brace may be implemented as an interior rib flange along an interior of the cover top or an interior rib flange along an interior of the plurality of cover side walls. In other embodiments, an interior brace may be implemented an interior support beam across an interior of the cover top or across an interior of the plurality of cover side walls and connected to two of the plurality of cover side walls. Still further, in some embodiments, an interior brace to reinforce structural integrity may include an vertical support beam connected to the interior support beam and the cover top. And, in other embodiments, an interior brace to reinforce structural integrity may be implemented as an interior support beam across an interior of the plurality of cover side walls and connected to at least one of the plurality of cover side walls and the cover top.

Rather than using internal bracing, structural integrity of the side walls or cover top may be reinforced using surface corrugation.

The cover fasteners are mounted along the bottom wall perimeter and are configured to secure the plurality of cover side walls to the trailer tank so that the traditional storage region of the trailer tank is augmented with an expanded storage region that allows storage of more bulk material than could otherwise be stored in the trailer tank alone. The cover fasteners may include a fastener hinge mounted to the trailer tank along a top edge of the trailer tank, a fastening bar operatively connected to the hinge to swing upward toward the plurality of side walls and a fastener cradle mounted to the plurality of side walls along the bottom wall perimeter. Of course, one of skill in the art would understand that this cover fastener may be reversed whereby the fastener hinge is mounted to the side walls and the fastening bar connected to the hinge to swing downward to the top edge of the trailer tank to rest inside the fastener cradle mounted to the top edge of the trailer tank. The fastener cradle may have two cradle guides spaced apart to receive the fastening bar between the two cradle guides when the fastening bar rotates into the fastener cradle. The cover fasteners may include a fastening cap threaded onto the distal end of the fastening bar that secures the fastening bar in the cradle by rotating the fastening cap until the fastening cap tightens down on the cradle guides. The fastening cap may have a movable handle that provides additional leverage to an operator turning the fastening cap. The cover fasteners may also include a fastening plate mounted to the plurality of side walls along the bottom wall perimeter which includes at least one fastening plate hole, a bolt configured to pass through the fastening plate hole in the mounting plate and a tank mounting hole in a tank mounting plate configured along a top edge of the trailer tank and a nut configured to secure the bolt in the fastening plate and in the tank mounting plate of the trailer tank. The rigid cover for the dump trailer tank may also include one or more alignment projections extending downward from the bottom wall perimeter at the corners formed from the plurality of side walls. The alignment projections hold the rigid cover in place on the trailer tank while an operator secures the rigid cover to the trailer tank with the cover fasteners.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIGS. 8A-F are schematic diagrams showing different interior braces for reinforcing the structural integrity of the rigid cover according to embodiments of the present invention;

FIG. 11 is a perspective view of the rigid cover of FIG. 2 for a dump trailer tank according to embodiments of the present invention having surface corrugation; and FIGS. 12A-B are enlarged views of the different surface corrugation patterns for reinforcing the structural integrity of the rigid cover of FIG. 11 according to embodiments of the present invention.

DETAILED DESCRIPTION OF THE PREFERRED EMBODIMENT

In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawing which does not limit the scope and the ambit of the invention.

As used herein, the singular forms "a", "an" and "the" include plural referents unless the context clearly dictates otherwise. "And" as used herein is interchangeably used with "or" unless expressly stated otherwise. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
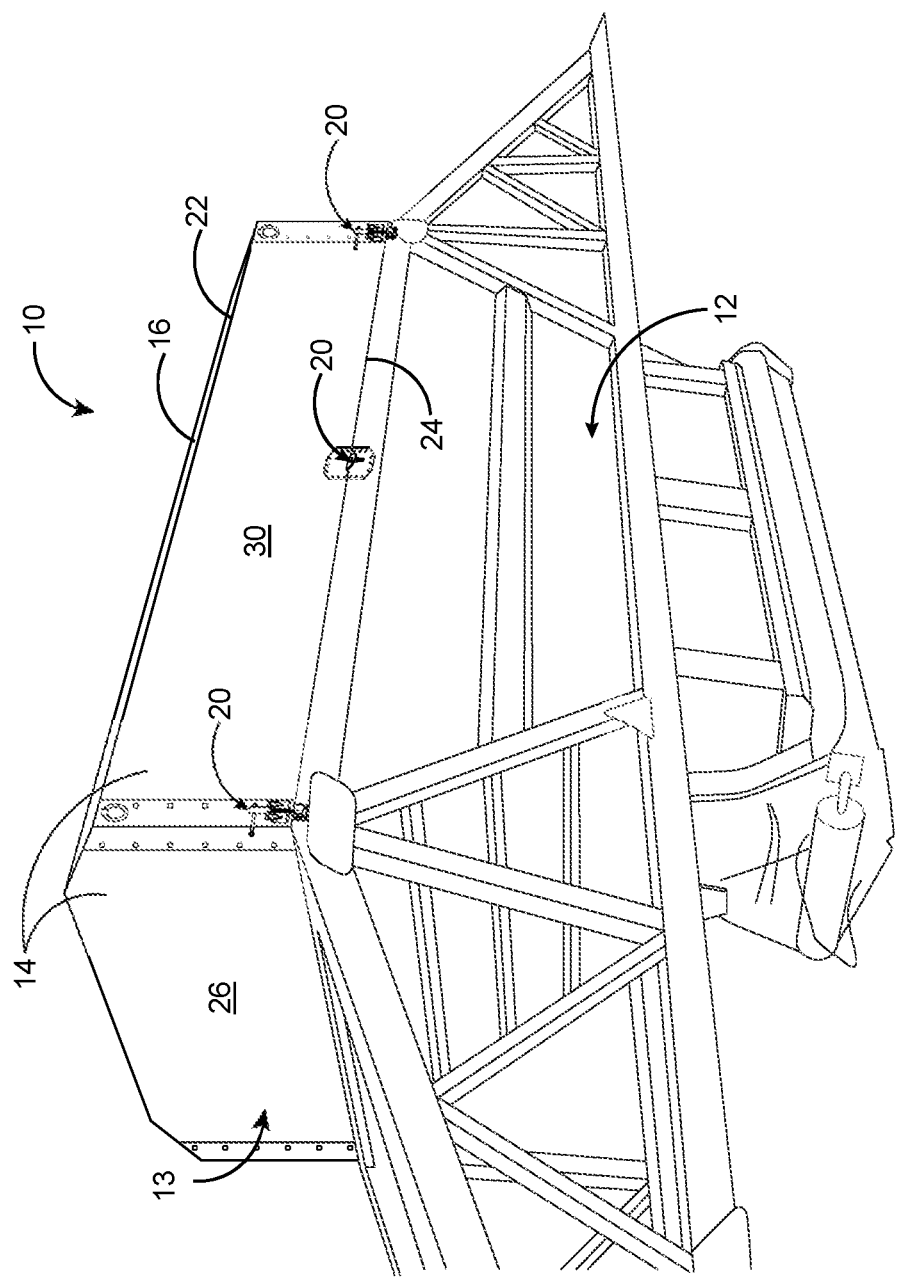
FIG. 1 is a perspective view of a rigid cover mounted over a traditional storage region of a dump trailer tank according to embodiments of the present invention.

FIG. 1 is a perspective view of a rigid cover 10 mounted over a traditional storage region of a bottom dump trailer tank 12 according to embodiments of the present invention. The rigid cover 10 includes a plurality of cover side walls 14, a cover top 16, one or more ports 18 (See FIG. 2) and a plurality of cover fasteners 20. The cover side walls 14 of FIG. 1 are substantially vertical structures that permit the rigid cover 10 to extend the traditional storage region of a bottom dump trailer tank 12 according to embodiments of the present invention by augmenting the traditional storage region of the trailer tank 12 with an expanded storage region 13 that allows storage of more bulk material than could otherwise be stored in the trailer tank 12 alone. The cover side walls 14 of FIG. 1 may be construction using a variety of materials as will be known to those of skill in the art including, for example, but not limited to metal, alloys, wood, certain rigid plastics or rubber, or some combination thereof.

The plurality of cover side walls 14 of FIG. 1 includes a top wall perimeter 22 and a bottom wall perimeter 24 and is configured along the bottom wall perimeter 24 to correspond in shape with the open top of the trailer tank 12. The plurality of cover side walls 14 is designed such that it includes a front side wall 26, a rear side wall 28 (See FIG. 5), a first side wall 30 and a second side wall 32 (See FIG. 5). In the example of FIG. 1, the front side wall 30 is the wall of the cover side walls 14 that faces the front of the trailer where the trailer hitches to a truck. The rear side wall 28 (See FIG. 5) described herein is the wall of the cover side walls 14 that faces the opposite direction of the front side wall 26 away from where the trailer hitches to a truck. The first side wall 30 and second side wall 32 (See FIG. 5) described in these embodiments are the walls of the cover side walls 14 that face laterally away from the sides of the trailer. Although the rigid cover 10 of FIG. 1 is implemented as a cover for a bottom dump trailer, rigid covers according to embodiments of the present invention would be beneficial for use with rear dump trailers such as, for example, the trailer mounted on the back of a dump truck.

Figure 2:
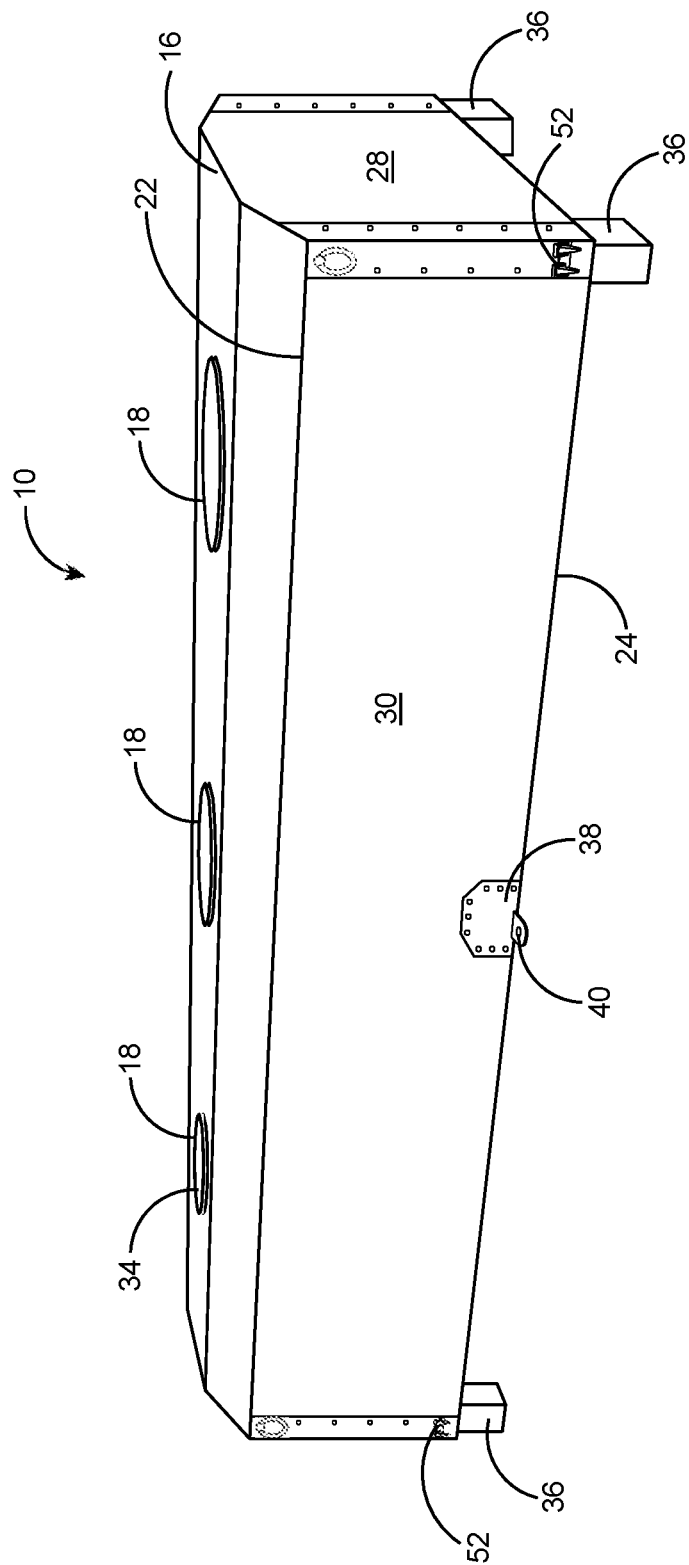
FIG. 2 is a perspective view of the rigid cover for a dump trailer tank according to embodiments of the present invention.

FIG. 2 is a perspective view of the rigid cover 10 for a bottom dump trailer tank 12 according to embodiments of the present invention. The cover top 16 is connected to the plurality of cover side walls 14 along the top wall perimeter 22. The cover top 16 is higher at a center region than at side regions adjacent to the plurality of cover side walls 14 to allow for increased bulk material storage capacity and helps to load as much as into the trailer because if the top was flat then the material would fill up to the hole in a conical fashion before filling into the area around the hole. The one or more ports 18 in the cover top 16 also include a port lid 34 which can be removable port lid, a sliding port lid or a hinged port lid. A removable port lid according to some embodiments of the present invention is a lid used to open and close the port by detaching and reattaching the lid from and on to, respectively, the port. When attached, the removable port lid may be secured using a variety of latches or clamps, such as, for example only, pull-action latch clamps. A sliding port lid according to some embodiments of the present invention is a lid used to open and close the port by sliding away from and on to, respectively, the port. A hinged port lid according to some embodiments of the present invention is a lid used to open and close the port by rotating down on to and away from, respectively, the port.

Figure 3:
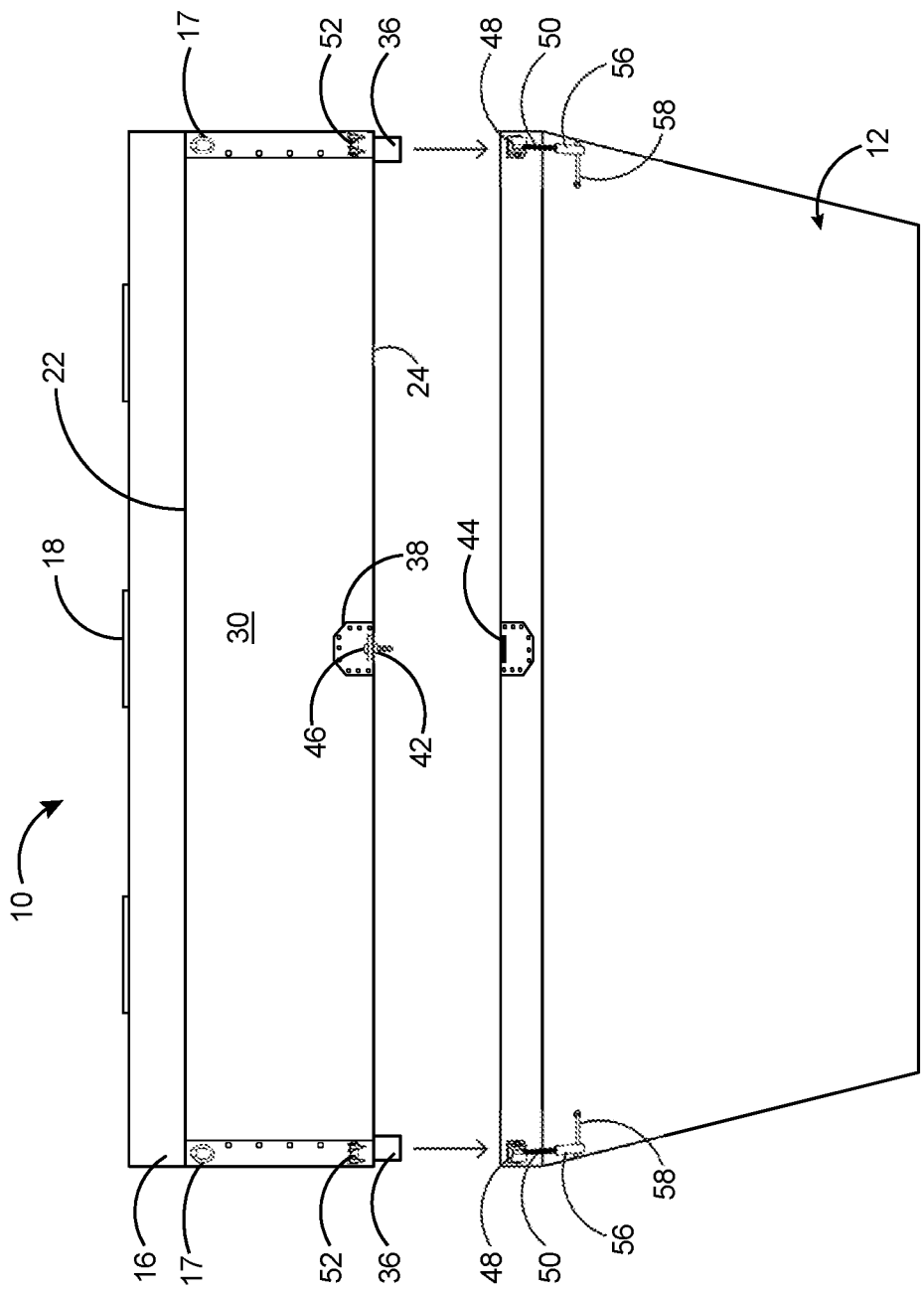
FIG. 3 is a side view of the rigid cover mounted over the traditional storage region of a dump trailer tank according to embodiments of the present invention.

FIG. 3 is a side view of the rigid cover 10 mounted over a traditional storage region of the bottom dump trailer tank 12 according to embodiments of the present invention. The rigid cover 10 for the bottom dump trailer tank 12 further includes one or more alignment projections 36 extending downward from the bottom wall perimeter 24 at corners formed from the plurality of cover side walls 14. The alignment projections 36 of FIG. 3 hold the rigid cover 10 in place on the trailer tank 12 while an operator secures the rigid cover 10 to the trailer tank 12 with the plurality of cover fasteners 20. The alignment projections 36 of FIG. 3 are useful because these projections 36 not only keep the rigid cover 10 from sliding off of the trailer tank 12, but such projections 36 also help ensure that the cover fasteners are aligned properly for engagement when the rigid cover 10 is lowered onto the trailer tank 12. To assist with raising and lowering the rigid cover 10, the rigid cover 10 in the example of FIG. 3 includes lifting rings 17. The lifting rings 17 of FIG. 3 may be welded to the plurality of side walls 14 or connected using heavy-duty hinges.

FIGS. 1-3 each utilize two different types of cover fasteners 20. In the middle of the first side wall 30 (See FIG. 3), the cover fastener 20 consists of two plates mounted together with a bolt-nut combination in the manner described herein according to embodiments of the present invention. That is, the middle cover fastener 20 (See FIG. 1) includes a fastening plate 38 mounted to the plurality of cover side walls along the bottom wall perimeter 24 which includes at least one fastening plate hole (not shown), a bolt 46 configured to pass through the fastening plate hole (not shown) in the mounting plate 38 and a tank mounting hole (not shown) in a tank mounting plate 44 configured along a top edge of the trailer tank 12 and a nut 42 configured to secure the bolt in the fastening plate 38 and the tank mounting plate 44 on the trailer tank 12.

The second type of cover fastener 20 used in FIGS. 1-3 is a quick connect fastener according to embodiments of the present invention. A quick connect fastener as used in embodiments of the present invention allows an operator to engage and disengage a particular cover fastener without the use of tools other than the operator's hands. This second type of cover fastener 20 used in FIGS. 1-3 is further described with reference to FIG. 4.

Figure 4:
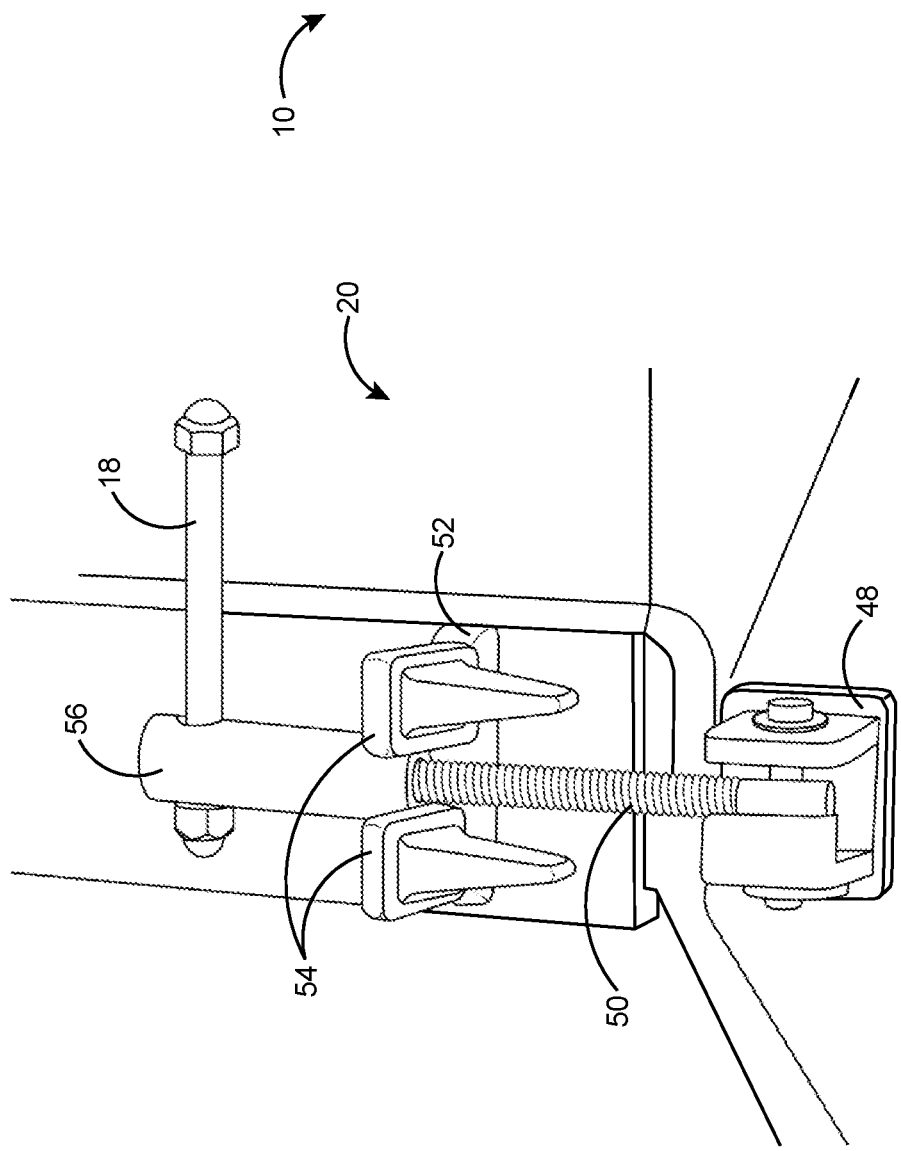
FIG. 4 is a perspective view of a cover fastener of the rigid cover for a dump trailer tank according to embodiments of the present invention.

FIG. 4 is a perspective view of another type of the cover fasteners 20 of the rigid cover 10 for the bottom dump trailer tank 12 according to embodiments of the present invention. The plurality of cover fasteners 20 is mounted along the bottom wall perimeter 24 and is configured to secure the plurality of cover side walls 14 to the trailer tank 12 so that the traditional storage region of the trailer tank 12 is transformed into an expanded storage region that allows storage of more bulk material than could otherwise be stored in the trailer tank 12 alone. The cover fastener 20 of FIG. 4 includes a fastener hinge 48 mounted to the trailer tank 12 along a top edge of the trailer tank 12. The cover fastener 20 of FIG. 4 also includes a fastening bar 50 operatively connected to the fastener hinge 48 to swing upward toward the plurality of side walls 14. The cover fastener 20 of FIG. 4 has a fastener cradle 52 mounted to the plurality of cover side walls 14 along the bottom wall perimeter 24. The fastener cradle 52 has two cradle guides 54 spaced apart to receive the fastening bar 50 between the two cradle guides 54 when the fastening bar 50 rotates into the fastener cradle 52. The cover fastener 20 of FIG. 4 includes a fastening cap 56 threaded onto the distal end of the fastening bar 50 that secures the fastening bar 50 in the cradle 52 by rotating the fastening cap 56 until the fastening cap 56 tightens down on the cradle guides 54. To facilitate tightening the fastening cap without the need for any tools, the fastening cap 56 of FIG. 4 includes a movable handle 58 that provides additional leverage to an operator turning the fastening cap 56. Of course, one of skill in the art would understand that the cover fastener 20 of FIG. 4 is for example only and not for limitation. Other cover fasteners useful in embodiment of the present invention may be reversed whereby the fastener hinge is mounted to the side walls of the cover and the fastening bar connected to the hinge to swing downward to the top edge of the trailer tank to rest inside the fastener cradle mounted to the top edge of the trailer tank.

Those of skill in the art will recognize that although the embodiments of the present invention described herein utilize both of these previously described fastener types, such use in combination is for example and illustration only, not for limitation. Either of these fastener types or any other cover fastener as will occur to those of skill of the art may be useful in embodiments of the present invention.

Figure 5:
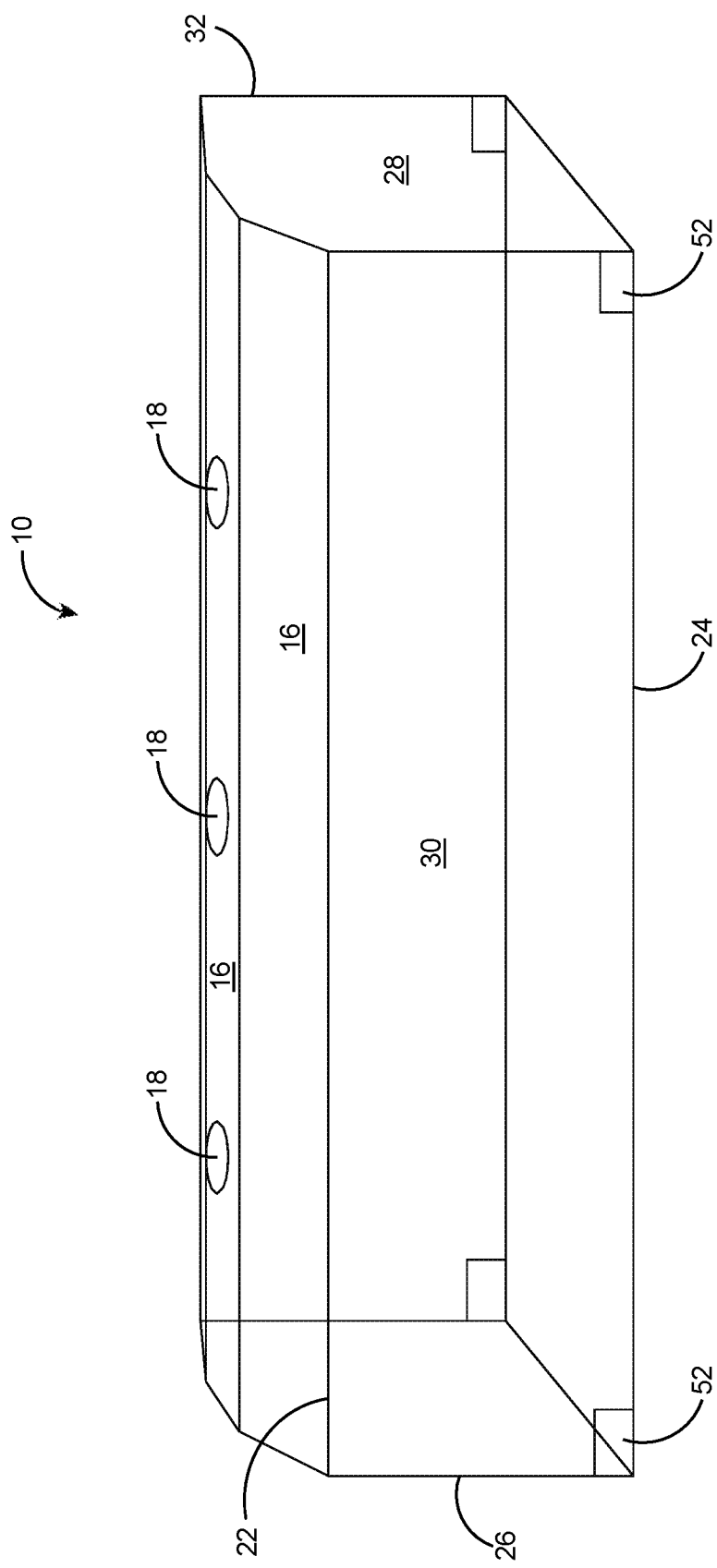
FIG. 5 is a schematic diagram of the rigid cover showing three eighteen inch ports in the cover top of a rigid cover for a dump trailer tank in accordance with embodiments of the present invention.
Figure 6:
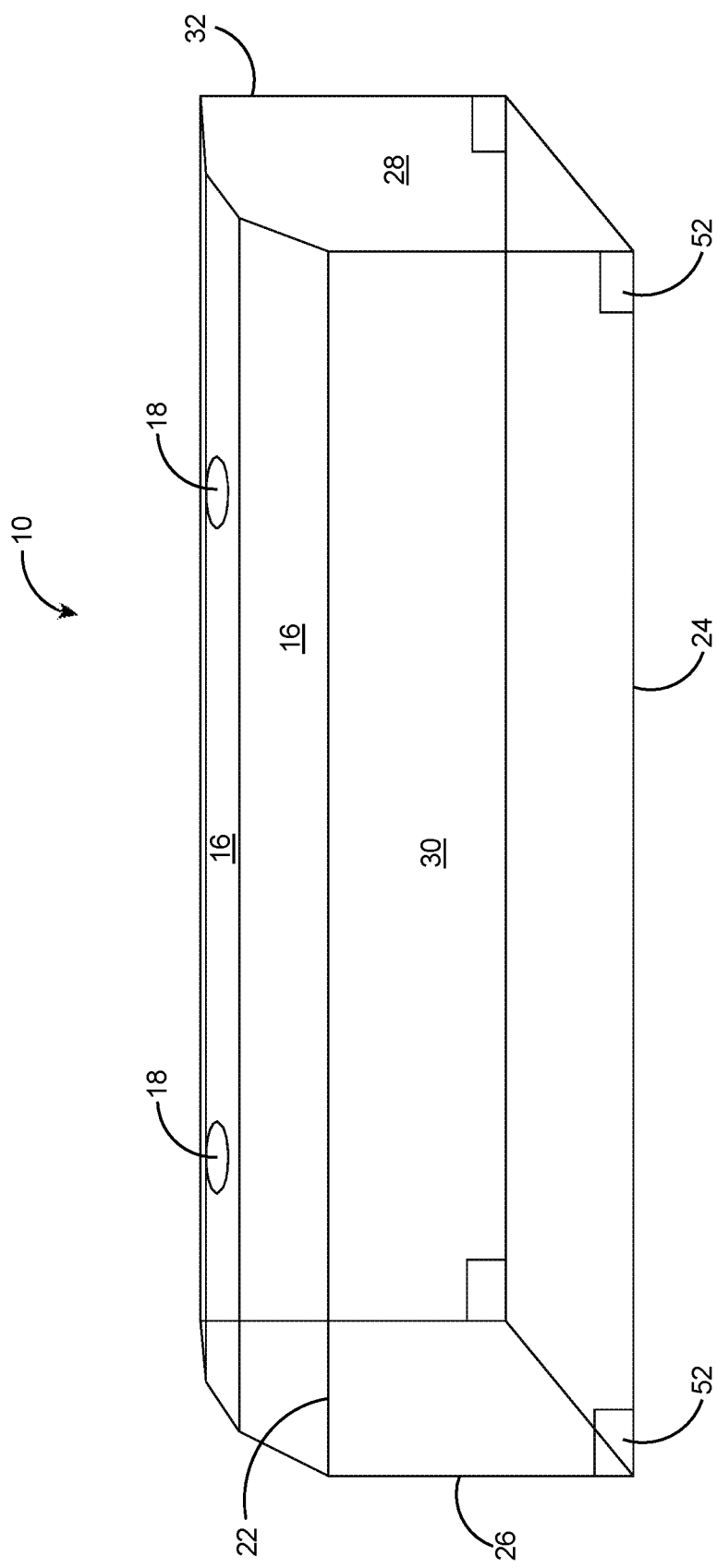
FIG. 6 is a schematic diagram of the rigid cover showing two thirty inch ports in the cover top of a rigid cover for a dump trailer tank in accordance with embodiments of the present invention.

FIGS. 5 and 6 are schematic diagrams of the rigid cover 10 showing three 18" ports 18 and two 30" ports 18 for loading and unloading the trailer tank 12 in accordance with the preferred embodiment of the present invention. Having more than one port 18 in the cover top 16 enables an operator to load more, as the material is filled to form an ant hill-like structure in the trailer tank 12 and multiple ports 18 allows loads of even more material to get multiple ant hill structures. One of skill in the art will recognize that the shape and diameter of the ports in the examples of FIGS. 5 and 6 are for example only and not for limitation. Other shapes and sizes may be useful and the size of the port for any given embodiment may depend on a variety of factors as will occur to those of skill in the art including, but not limited to, the desired loading speed for a particular bulk material, the apparatus available to fill a trailer, the granularity of the bulk material, the overall shape of the rigid cover, and so on. Other embodiments of the port may be shaped in the form of a square, rectangle, ellipse or other shape, and there is no requirement that the lid be shaped in the same manner as the port opening—only that the port lid cover the port opening.

Although not shown, to keep out water or other materials from getting through the port when the lid is closed, the port may include a gasket around the edge of the lid so that the lid seals on the opening when closed. Alternatively, or in addition to, a gasket, a port according to embodiments of the present invention could include a flange around the opening that the port lid fits around to help prevent contaminants or other materials from getting through the port into the storage area.

Figure 7:
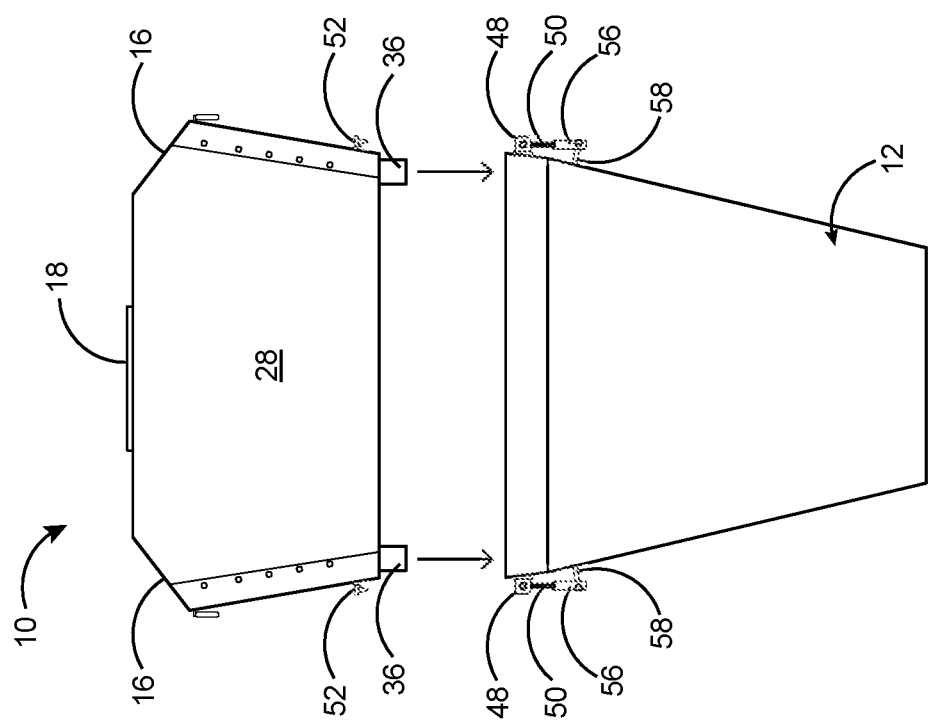
FIG. 7 is a front view of the rigid cover mounted over the traditional storage region of a dump trailer tank showing the cover side walls flare outwards according to embodiments of the present invention.

FIG. 7 is a front view of the rigid cover 10 mounted over the traditional storage region of the bottom dump trailer tank 12 showing the cover side walls 14 flare outwards away from the center of the rigid cover with respect to the plurality of side walls at the bottom wall perimeter to allow for increased bulk material storage capacity according to embodiments of the present invention.

In many embodiments of the present invention, the side walls and cover top are made from three-sixteenth (3/16) inch thick steel. In other embodiments of the present invention, the side walls and cover top may be implemented using aluminum or some carbon fiber material. Thicker sheets may increase the weight load of the trailer top and thereby may limit the amount of cargo that can be carried because of the weight limits on the trailers and vehicle traveling on highways. Thinner sheets may decrease the overall structural integrity of the rigid cover. To increase the structural integrity of rigid cover, either or both of the cover top and the cover side walls may include an interior brace to reinforce structural integrity. The interior nature of the interior brace means that the brace is configured on the inside of the rigid cover in the expanded storage region 13 (See FIGS. 1 and 8A-F).

FIGS. 8A-F are schematic diagrams showing different interior braces for reinforcing the structural integrity of the rigid cover 10 according to embodiments of the present invention. FIG. 8A depicts interior braces as interior rib flanges 80 along the interior of the cover top 16 and along the interior of the plurality of cover side walls 14. A flange according to embodiment of the present invention is an external or internal ridge, or rim, for strength, or attachment to another object. The interior rib flanges 80 of FIG. 8A are internal and may be made of the same types of materials as the cover top or side walls, although the materials may not be same in any given embodiment.

FIG. 8B depicts interior braces as an interior support beam 81 across the interior of the cover side walls 14. A beam according to embodiment of the present invention may be tubular or solid or some composite of a solid with pockets of air or other medium lighter in weight than the solid forming the beam. The interior support beam 81 of FIG. 8B is connected to two of the cover side walls 14. FIG. 8C depicts interior braces as an interior support beam 81 across the interior of the cover side walls 14 and as vertical support beam 82 connected to the interior support beam 81 and the cover top 16. FIG. 8D depicts interior braces as interior support beams 83,84 across the interior of the cover side walls 14. The interior support beams 83,84 connect to opposite cover side walls 14. FIG. 8E depicts interior braces as interior support beams 85,86 across the interior of the cover side walls 14. Each of the interior support beams 85,86 connect to a cover side wall 14 and the cover top 16. The interior support beams 85,86 may connect together to form an 'X' shape or may not touch or be connected together at all. FIG. 8F depicts interior braces as an interior support beam 87 across an interior of the cover top 16. One of skill in the art will understand that placement of in interior brace according to embodiments of the present invention on either side of a port may be advantageous so as not to block the bulk material being loaded into the trailer via that port.

Figure 9:
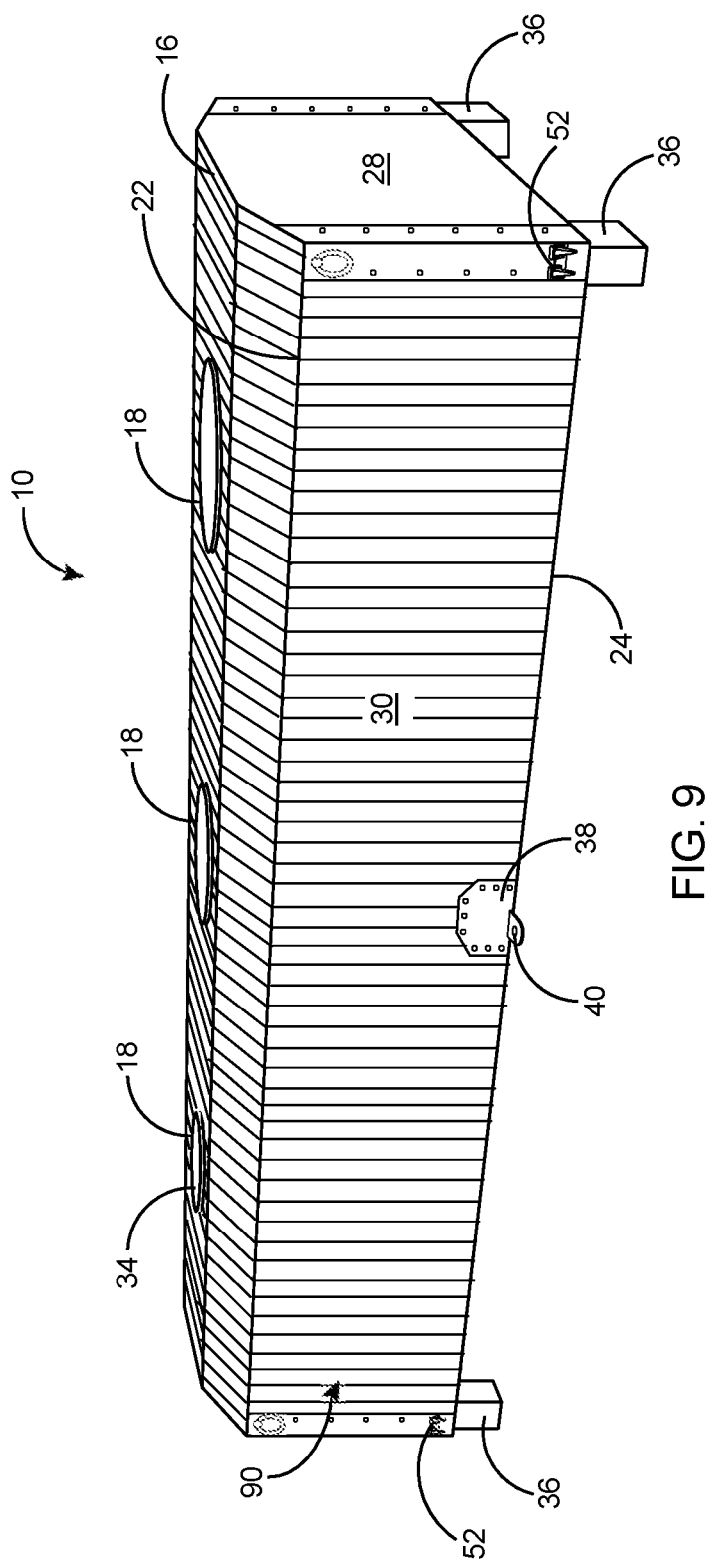
FIG. 9 is a perspective view of the rigid cover of FIG. 2 for a dump trailer tank according to embodiments of the present invention having surface corrugation.

FIG. 9 is a perspective view of the rigid cover 10 of FIG. 2 for a bottom dump trailer tank according to embodiments of the present invention with some surface corrugation. Surface corrugation according to embodiments of the present invention means that the surface of a material is shaped into alternate areas of ridges and valleys. Surface corrugation according to embodiments of the present invention may be formed from crimping sheet material, stamping sheet material or various other mechanisms as will occur to those of skill in the art.

Figure 10C:
FIGS. 10A-C are schematic diagrams showing different surface corrugation patterns for reinforcing the structural integrity of the rigid cover of FIG. 9 according to embodiments of the present invention.
Figure 10B:
Figure 10A:

FIGS. 10A-C are schematic diagrams showing different surface corrugation patterns 91,92,93 for reinforcing the structural integrity of the rigid cover of FIG. 9 according to embodiments of the present invention. The surface corrugation pattern 91 of FIG. 10A is implemented as a sine wave. The surface corrugation pattern 92 of FIG. 10B is implemented as a trapezoid wave. The surface corrugation pattern 93 of FIG. 10C is implemented as a triangle wave.

FIG. 11 is a perspective view of the rigid cover 10 of FIG. 2 for a bottom dump trailer tank according to embodiments of the present invention having other types of surface corrugation. FIGS. 12A-B are enlarged views of the different surface corrugation patterns for reinforcing the structural integrity of the rigid cover 10 of FIG. 11 according to embodiments of the present invention. The surface corrugation pattern depicted in FIG. 12A is implemented as a series of hemispherical bumps along the surface of the cover side wall 30. The surface corrugation pattern depicted in FIG. 12B is implemented as a series of elliptical bumps in perpendicular orientation along portions of the surface of the cover top 16.

The surface of the material used to form the cover side walls and cover top according to the embodiments of the present invention may be painted or galvanized to reduce corrosion caused by rust and increase the longevity of the rigid cover when the cover is made from metal. Of course when the rigid cover is implemented using other materials, such as for example a carbon fiber material, one of skill in the art would recognize certain techniques available to increase the life span of the rigid cover.

The claimed subject matter has been provided here with reference to one or more features or embodiments. Those skilled in the art will recognize and appreciate that, despite the detailed nature of the exemplary embodiments provided here; changes and modifications may be applied to said embodiments without limiting or departing from the generally intended scope. These and various other adaptations and combinations of the embodiments provided here are within the scope of the disclosed subject matter as defined by the claims and their full set of equivalents.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A rigid cover for a dump trailer tank used to transport bulk material, the dump trailer tank having a traditional storage region with an open top, the rigid cover comprising:
    a plurality of cover side walls having a top wall perimeter and a bottom wall perimeter, said plurality of cover side walls configured along the bottom wall perimeter to correspond in shape with the open top of the trailer tank;
    a cover top connected to the plurality of cover side walls along the top wall perimeter, wherein at least one of the cover top and the plurality of cover side walls comprise an interior brace to reinforce structural integrity;
    one or more ports in the cover top; and
    a plurality of cover fasteners mounted along the bottom wall perimeter and configured to secure the plurality of cover side walls to the trailer tank so that the traditional storage region of the trailer tank is augmented with an expanded storage region that allows storage of more bulk material than could otherwise be stored in the trailer tank alone, wherein at least one of the plurality of cover fasteners comprises: (i) a fastening plate mounted to the plurality of side walls along the bottom wall perimeter, the fastening plate having at least one fastening plate hole; (ii) a bolt configured to pass through the fastening plate hole in the mounting plate and a tank mounting hole in a tank mounting plate configured along a top edge of the trailer tank; (iii) a nut configured to secure the bolt in the fastening plate and the tank mounting plate.

2. The rigid cover of claim 1 wherein the interior brace to reinforce structural integrity further comprises an interior rib flange along an interior of the cover top.

3. The rigid cover of claim 1 wherein the interior brace to reinforce structural integrity further comprises an interior rib flange along an interior of the plurality of cover side walls.

4. The rigid cover of claim 1 wherein the interior brace to reinforce structural integrity further comprises an interior support beam across an interior of the cover top.

5. The rigid cover of claim 1 wherein the interior brace to reinforce structural integrity further comprises an interior support beam across an interior of the plurality of cover side walls and connected to two of the plurality of cover side walls.

6. The rigid cover of claim 1 wherein the interior brace to reinforce structural integrity further comprises an vertical support beam connected to the interior support beam and the cover top.

7. The rigid cover of claim 1 wherein the interior brace to reinforce structural integrity further comprises an interior support beam across an interior of the plurality of cover side walls and connected to at least one of the plurality of cover side walls and the cover top.

8. The rigid cover of claim 1 wherein the cover top is higher at a center region than at side regions adjacent to the plurality of cover side walls to allow for increased bulk material storage capacity.

9. The rigid cover of claim 1 wherein the plurality of side walls flares outward away from the center of the rigid cover with respect to the plurality of side walls at the bottom wall perimeter to allow for increased bulk material storage capacity.

10. The rigid cover of claim 1 wherein the plurality of cover side walls includes a first side wall, a second side wall, a front side wall and a rear side wall.

11. The rigid cover of claim 1 wherein at least one of the one or more ports in the top cover further comprises a port lid.

12. The rigid cover of claim 1 further comprising one or more alignment projections extending downward from the bottom wall perimeter at corners formed from the plurality of side walls, the one or more alignment projections holding the rigid cover in place on the trailer tank while an operator secures the rigid cover to the trailer tank with the cover fasteners.

13. The rigid cover of claim 1 wherein at least one of the plurality of cover fasteners comprises a quick-connect fastener.

14. A rigid cover for a dump trailer tank used to transport bulk material, the dump trailer tank having a traditional storage region with an open top, the rigid cover comprising:
    a plurality of cover side walls having a top wall perimeter and a bottom wall perimeter, said plurality of cover side walls configured along the bottom wall perimeter to correspond in shape with the open top of the trailer tank;
    a cover top connected to the plurality of cover side walls along the top wall perimeter, wherein at least one of the cover top and the plurality of cover side walls comprise an interior brace to reinforce structural integrity;
    one or more ports in the cover top; and
    a plurality of cover fasteners mounted along the bottom wall perimeter and configured to secure the plurality of cover side walls to the trailer tank so that the traditional storage region of the trailer tank is augmented with an expanded storage region that allows storage of more bulk material than could otherwise be stored in the trailer tank alone, wherein at least one of the plurality of cover fasteners comprises: (i) a fastener hinge mounted to the plurality of side walls along the bottom wall perimeter; (ii) a fastening bar operatively connected to the hinge to swing downward toward the trailer tank; (iii) a fastener cradle mounted to the trailer tank along a top edge of the trailer tank, the fastener cradle having two cradle guides spaced apart to receive between the two cradle guides the fastening bar when the fastening bar rotates into the fastener cradle; (iv) a fastening cap threaded onto the distal end of the fastening bar that secures the fastening bar in the cradle by rotating the fastening cap until the fastening cap tightens down on the cradle guides.

15. The rigid cover of claim 14 wherein the fastening cap further comprises a movable handle that provides additional leverage to an operator turning the fastening cap.

16. A rigid cover for a dump trailer tank used to transport bulk material, the dump trailer tank having a traditional storage region with an open top, the rigid cover comprising:

a plurality of cover side walls having a top wall perimeter and a bottom wall perimeter, said plurality of cover side walls configured along the bottom wall perimeter to correspond in shape with the open top of the trailer tank;

a cover top connected to the plurality of cover side walls along the top wall perimeter, wherein at least one of the cover top and the plurality of cover side walls comprise an interior brace to reinforce structural integrity;

one or more ports in the cover top; and a plurality of cover fasteners mounted along the bottom wall perimeter and configured to secure the plurality of cover side walls to the trailer tank so that the traditional storage region of the trailer tank is augmented with an expanded storage region that allows storage of more bulk material than could otherwise be stored in the trailer tank alone, wherein at least one of the plurality of cover fasteners comprises: (i) a fastener hinge mounted to the trailer tank along a top edge of the trailer tank; (ii) a fastening bar operatively connected to the hinge to swing upward toward the plurality of side walls; (iii) a fastener cradle mounted to the plurality of side walls along the bottom wall perimeter, the fastener cradle having two cradle guides spaced apart to receive between the two cradle guides the fastening bar when the fastening bar rotates into the fastener cradle; (iv) a fastening cap threaded onto the distal end of the fastening bar that secures the fastening bar in the cradle by rotating the fastening cap until the fastening cap tightens down on the cradle guides.

17. The rigid cover of claim 16 wherein the fastening cap further comprises a movable handle that provides additional leverage to an operator turning the fastening cap.

* * * * *